United States Patent
Folson et al.

[11] 3,711,964
[45] Jan. 23, 1973

[54] ASK AND ANSWER TOY

[75] Inventors: Henry J. Folson, Redondo Beach, Calif.; James D. Hegel, Torrance, Calif.; William T. Hosokawa, Pasadena, Calif.; William B. Pester, Palos Verdes, Calif.; Irwin C. Poter, Quinter, Kans.

[73] Assignee: Mattel, Inc., Hawthorne, Calif.

[22] Filed: April 8, 1971

[21] Appl. No.: 132,468

[52] U.S. Cl. .................................... 35/8 A, 274/1 A
[51] Int. Cl. ............................................. G09b 3/00
[58] Field of Search ............... 35/8 A, 35 C; 274/1 A

[56] References Cited

UNITED STATES PATENTS

| | | | |
|---|---|---|---|
| 3,383,114 | 5/1968 | Ryan | 35/8 A X |
| 3,510,966 | 5/1970 | Golden et al. | 35/35 C |
| 3,581,410 | 6/1971 | Zeigner et al. | 274/1 A X |

Primary Examiner—Wm. H. Grieb
Attorney—Seymour A. Scholnick

[57] ABSTRACT

A phonograph toy with a pointer wheel that can be turned so that a pointer thereon points to a picture that represents a question, and which automatically selects a record groove that asks the question when the phonograph is played. The pointer can be slid on the wheel to uncover a picture that represents the answer to the question, and the pointer then also selects another record groove that answers the question. The record is a disc with leadin groove portions spaced thereabout, and the particular groove that will be played is determined by the rotational position at which the disc stops during winding of a spring prior to playing. As the disc record rotates in reverse during spring winding, it rotates an index member with a helical ramp. The rotating helical ramp raises and then drives a moveable stop so the stop can contact another stop on the pointer and prevent any further reverse record rotation. During forward record rotation, when a groove is played, the ramp lowers the moveable stop so it is clear of the pointer stop.

11 Claims, 6 Drawing Figures

PATENTED JAN 23 1973

INVENTORS
HENRY J. FOLSON
JAMES D. HEGEL
WILLIAM T. HOSOKAWA
WILLIAM B. PESTER
IRWIN C. PORTER

BY Max E. Shirk
ATTORNEY

INVENTORS
HENRY J. FOLSON
JAMES D. HEGEL
WILLIAM T. HOSOKAWA
WILLIAM B. PESTER
IRWIN C. PORTER

BY Mark E. Shirk
ATTORNEY

ASK AND ANSWER TOY

BACKGROUND OF THE INVENTION

1. Field of the Invention

This invention relates to toy phonographs.

2. Description of the Prior Art

Entertaining toy phonographs have been available which enable a child to rotate a pointer to any one of a number of pictures, and which selects a record track corresponding to the picture and plays it when a string is pulled and released. Even greater entertainment and educational value could be obtained from a phonograph toy if it allowed a child to visually select and then play a recording asking a question and then visually indicated and played a recording which gave the answer. In order for such a toy to be successful, it is necessary that the questions and answers be selectable in a natural manner, so that the toy can be operated without detailed instructions to a child, and that the toy mechanism be as simple as possible to enable its production at low cost.

OBJECTS AND SUMMARY OF THE INVENTION

An object of the present invention is to provide a toy phonograph which enables a selection of pairs of visual markings and corresponding pairs of sound tracks in a simple and natural manner.

Another object is to provide a toy phonograph of simple construction which enables a child to simultaneously select a marking indicating a question and a sound track which asks the question, and to then select, in a natural manner, both a marking which indicates the answer to the question and a sound track that answers the question.

In accordance with one embodiment of the present invention, a toy phonograph is provided which enables a child to select questions and answers both visually and audibly in a natural manner. The toy includes two rings of markings, the outer ring indicating the subject matter of questions and the inner ring indicating the subject matter of the answers. A pointer can be rotated to select any question marking and can be radially slid to uncover the corresponding answer marking. The phonograph includes a disc record with numerous interleaved spiral grooves that are played when a child pulls a draw string and releases it. The particular groove that is played is determined by the rotational and radial position of the pointer, so that the sounds match the question or answer which the pointer is indicating The record is played by pulling a string that rotates a record-supporting turntable in a reverse direction to wind up a spring. The string is then released to allow the stylus of a tone arm to engage the record, while the spring rotates the turntable in a forward direction. The record grooves have circumferentially based leadin portions, and the groove which is selected is determined by the position at which the record stops when rotating in reverse. In order to select a particular groove, the pointer carries a pair of stops, and the turntable carries an index member that raises a drag bar into a position to contact one of the pointer stops as the turntable rotates in reverse. The index member has a helical ramp that raises the drag bar to engage a pointer stop during reverse turntable rotation. The helical ramp lowers the drag bar during forward turntable rotation, so that the drag bar is clear of the pointer stop.

The novel features of the invention are set forth with particularity in the appended claims. The invention will be best understood from the following description when read in conjunction with the accompanying drawings.

DESCRIPTION OF THE PREFERRED EMBODIMENT

Figure 1:
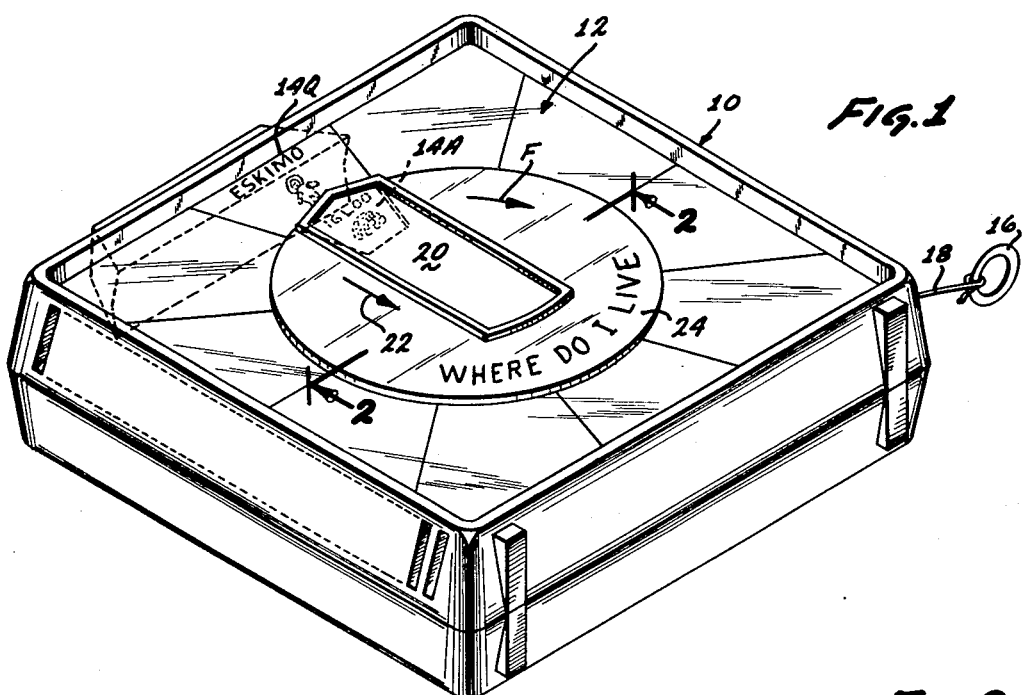
FIG. 1 is a perspective view of a phonograph toy constructed in accordance with the invention.

FIG. 1 illustrates a phonograph toy which asks and answers questions on a particular subject, such as where different peoples and animals live. The toy includes a housing 10 with a ring-shaped visual member 12 that is divided into ten sectors. Each sector contains a word and picture that represents the subject matter of the question. For example, the sector 14Q carries the word "Eskimo" and the picture of an Eskimo, to represent the question, "Where does an Eskimo live ?" When a child pulls and then releases the pull ring 16 at the end of a drawstring 18, the toy plays a recording such as, "Do you know where an Eskimo lives?" If a child then slides a pointer 20 in the direction of arrow 22, he uncovers another marking area 14A which contains the word "Igloo" and a picture of an igloo, to represent the answer to the question. If the child now pulls and releases the pull ring 16, the toy plays a recording such as, "An Eskimo lives in an igloo made of ice and snow." The pointer 20 is slidably mounted on a pointer wheel 24 that can be rotated in the direction of arrow F to point to any of the other ten sectors of the visual member 12. The recording which is played whenever the pull ring 16 is pulled, always represents the question or answer that is visually indicated by the markings to which the pointer 20 is pointing.

Figure 2:
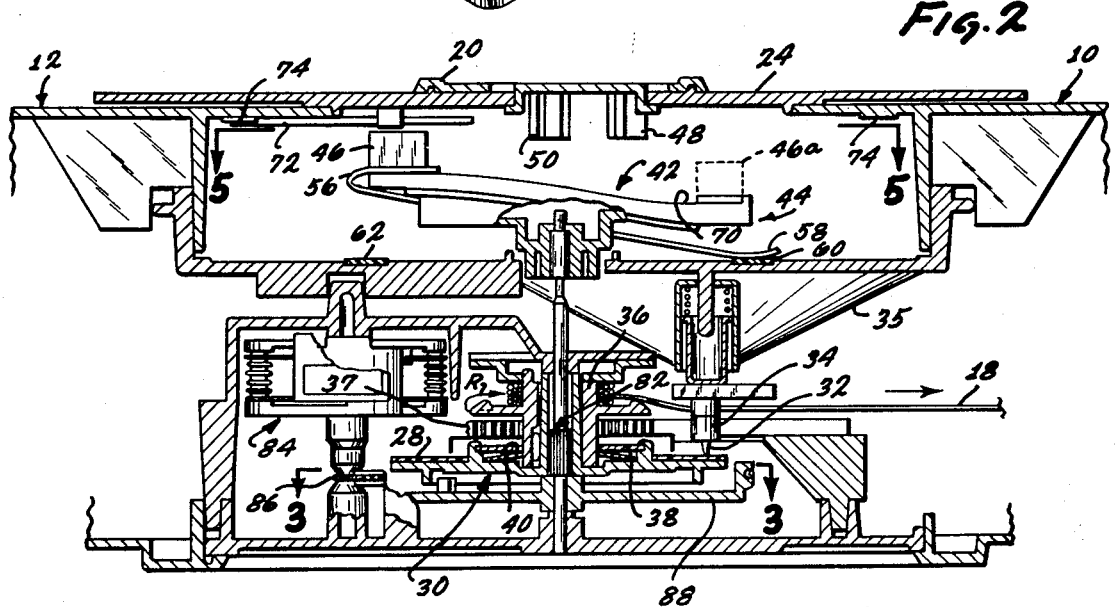
FIG. 2 is a view taken on the line 2—2 of FIG. 1.

FIG. 2 illustrates details of the mechanism which selects a pair of recordings in accordance with the rotational position of the pointer wheel 24, and which alternately selects the question or answer recording in accordance with the radial position of the pointer 20 on the wheel. The mechanism includes rotatably mounted on the housing 10. When the turntable 30 rotates in a forward direction (clockwise when seen from above) the stylus 32 of a tone arm 34 engages a groove in the record 28 to play a recording. The sounds picked up by the stylus are amplified by a speaker cone assembly 35 to make them clearly audible.

A playing cycle begins when the child pulls on the drawstring 18 to unwind the string from a sheave 36. The sheave 36, which is rotatably mounted coaxial with the turntable 30, then rotates in reverse as indicated by arrow R. As the sheave 36 rotates in reverse, it winds a spring 37 that will later drive the turntable during playing of the record. The sheave 36 carries a friction plate 38 which bears against a surface 40 of the turntable to urge the turntable to rotate in reverse with the sheave. As the turntable 30 rotates in reverse, an index member 42 fixed to the turntable drives a drag member 44 in reverse and also causes the drag member to wobble. As a result, a stop 46 of the drag member 44 is raised from the level indicated at 46a to the level shown in full lines at 46. The stop 46 is then also rotated in reverse. Soon after the raised drag member 46 begins rotating in reverse, it hits one of two pointer stops 48 or 50 that are fixed to the pointer 20.

When the drag stop 46 hits one of the pointer stops 48 or 50, it can no longer rotate in reverse. The drag stop 46 also prevents the turntable 30 and the record 28 thereon from rotating any further in reverse. Thus, when the drawstring 18 is pulled to wind the spring, the turntable and record 28 begin rotating in reverse but stop at a position determined by the location of one of the stops 48 or 50 on the pointer 20. The particular record track which will be played when the record begins rotating in a forward direction is determined by the position at which the record stops.

Figure 6:
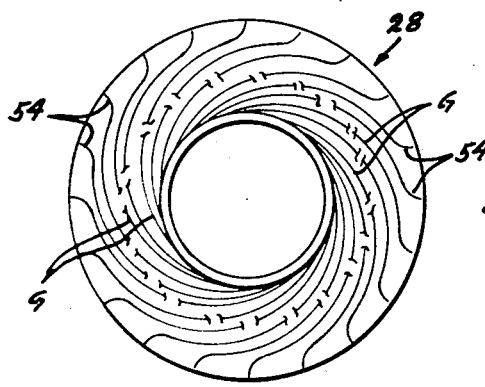
FIG. 6 is a plan view of the record in the phonograph toy.

FIG. 6 illustrates the record 28 and the twenty spiral grooves G therein. The grooves are interleaved and have leadin portions 54 circumferentially spaced about the record. During pulling of the drawstring 18, the tonearm stylus 32 is lifted off the record and moved to a position near its periphery. When the drawstring is released, the stylus moves down against the record and enters the leadin portion 54 of one of the twenty record grooves. As the turntable is rotated in a forward direction, the stylus continues the following along the particular groove whose leadin portion it has entered, and to play the sounds recorded in that groove.

The particular leadin portion which the stylus will enter depends upon the rotational position of the record as the stylus decends upon it. The rotational position of the record is determined by the rotational position of the particular pointer stop 48 or 50 which stops reverse rotation of the turntable and record as the drawstring is pulled. As the pointer 20 is turned to point to a different picture, the two stops 48 and 50 thereon rotate about the housing and move the pointer stops 48 and 50 accordingly. Only one of the stops 48 or 50 is in a position to contact the drag member stop 46. The particular pointer stop 48 or 50 which can contact the drag member stop is determined by the radial position of the pointer 20, that is, whether it is shifted radially outwardly to point to a question marking or shifted inwardly to point to an answer marking.

Figure 4:
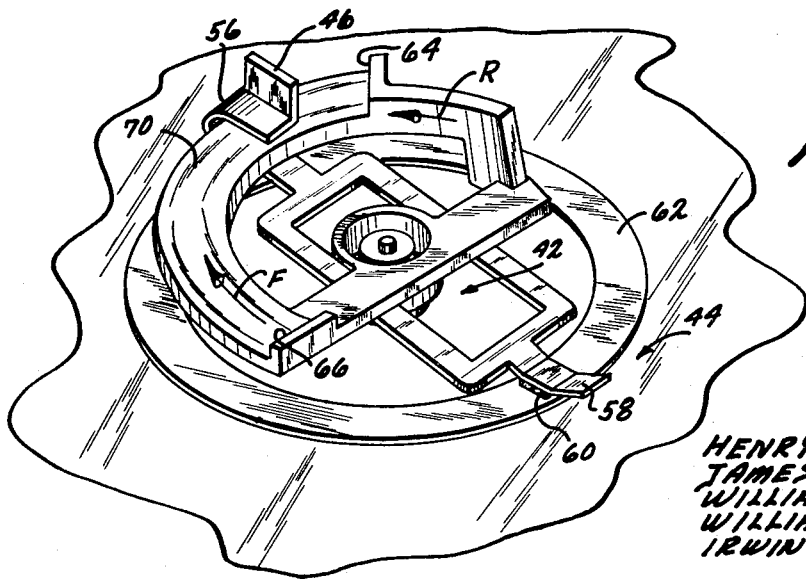
FIG. 4 is a partial perspective view of the mechanism of FIG. 2.

FIG. 4 illustrates the construction of the index member 42, which is fixed to the turntable 30, and of the drag member 44. The drag member 44 can rotate about the same axis as the turntable 30 and can also wobble about this axis of rotation, although it cannot shift radially across this axis. The drag member is coupled to the index member in a fashion which permits one arm 56, which carries the drag stop 46, to move up or down the spiral slope on the index member 42. The arm 58 has a friction pad 60 that bears against a drag ring 62 formed in the housing 10 of the toy, primarily by gravity forces (when the phonograph is oriented with the visual member 12 facing up). Thus, the drag member 44 resists rotation, but can be forced to rotate.

The indexing member 44 has two circumferentially spaced driving surfaces 64 and 66 which can contact the arm 56 of the drag member to force the drag member to rotate. The indexing member also has a helical or ramp portion 70 extending between the two driving surfaces 64, 66, and the drag arm 56 is engaged with this ramp portion. When the indexing member rotates in the reverse direction indicated by arrow R, but before the drive surface 64 contacts the drag arm 56, the arm 56 moves up the ramp portion 70 while the drag member 44 is stationary. Accordingly, the stop 46 moves upwardly and into a position to contact one of the pointer stops 48, 50. When the indexing member has rotated far enough in reverse, the driving surface 64 contacts the drag arm 56 and thereafter drives the drag member 44 in reverse. Such reverse rotation continues until the drag stop 46 contacts one of the pointer stops 48, 50. Then, the drag stop 46 can no longer rotate in reverse, and it prevents the driving surface 64 and indexing member 42 from rotating in reverse. This also stops the turntable and record from rotating any further in reverse. A child can continue to pull out the drawstring, however, to continue winding the spring.

When a child releases the drawstring to allow the spring to rotate the turntable in the forward direction, as indicated by the arrow F, the turntable and indexing arm 42 immediately begin rotating in the forward direction. However, the drag member 44 does not immediately begin rotating, because the friction pad 60 which contacts the drag ring 62 resists such rotation. Only after the indexing member 42 has rotated about 120° and the driving surface 66 contacts the drag arm 56, does the drag member 44 begin to rotate in the forward direction. During such 120° rotation of the indexing member, the drag arm 56 moves down the helical ramp 70. Thus, when the driving surface 66 begins rotating, the drag arm 56, the stop 46 thereon has moved down and therefore out of the way of the pointer stops 48, 50. As a result, the turntable can freely rotate in the forward direction without interference from the pointer stops.

Figure 5:
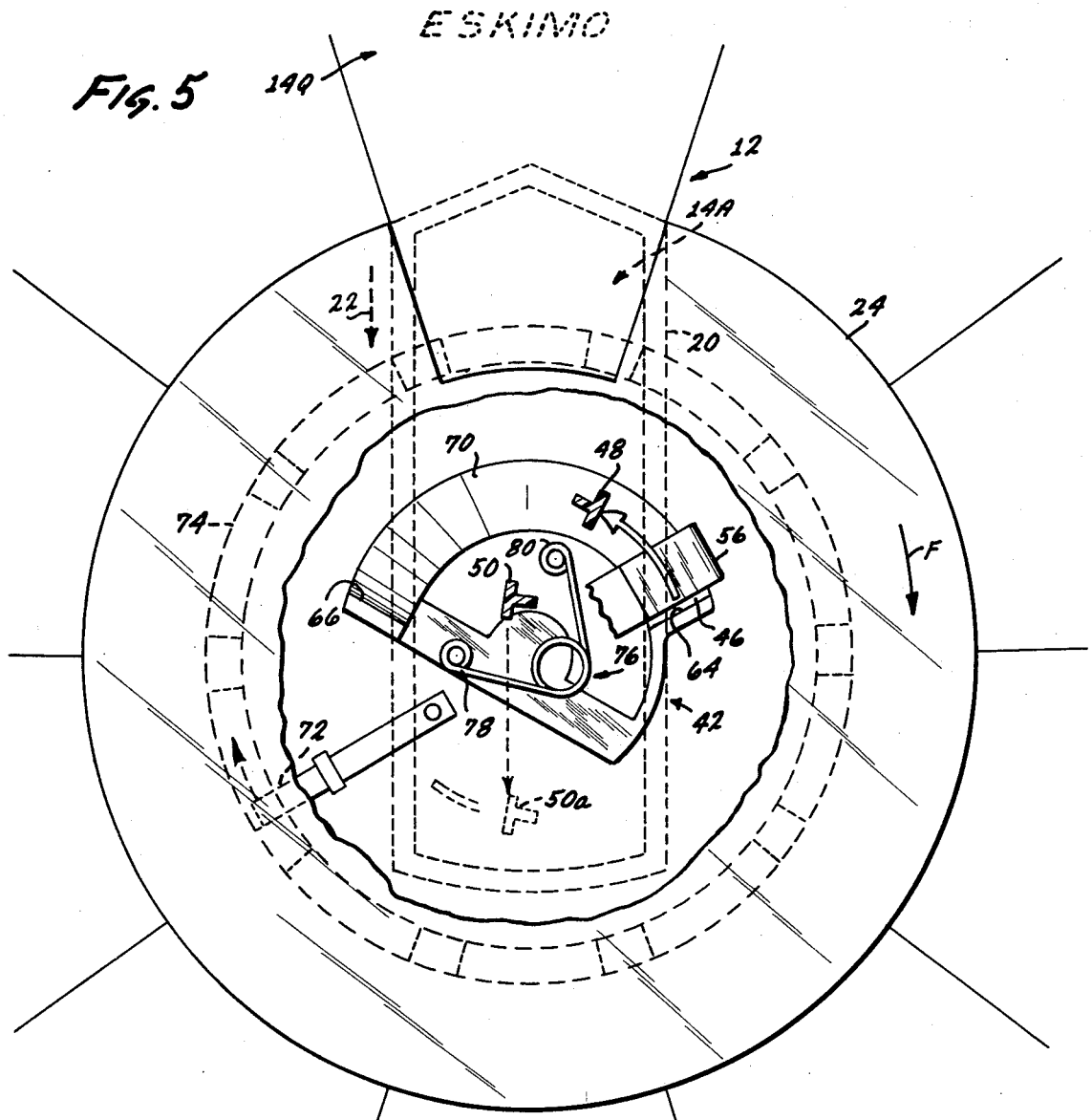
FIG. 5 is a view taken on the line 5—5 of FIG. 2.

FIG. 5 shows the location of the pointer stops, 48, 50 in relation to the pointer 20. The pointer is illustrated in its outward position so that it points towards a question region 14Q. As a result, one of the stops 48 which selects the record track that defines the question, is in the path of the drag stop 46. The other pointer stop 50 which is used to select the answer recording, is out of the path of the drag stop 46 and therefore does not engage it. It can be seen that as the indexing member 42 pushes the drag member 44 in reverse, the stop 48 determines the position in which the turntable will cease to rotate in reverse. Therefore, the stop 48 selects the next recording to be played.

When the pointer member 20 is slid radially inwardly as indicated by the arrow 22, the stop 48 will be moved to a position out of the path of the drag stop 46, while the other stop 50 will be moved to the position 50a. The answer stop 50a will then be in the path of the drag stop 46 and therefore will determine the rotational position at which the turntable stops. As the pointer 20 slides between its radially outward and radially inward positions, the locations at which the turntable and record will stop advances by 196° (or is delayed by 162°). The leadin portions of the question groove and corresponding answer groove are similiarly spaced on the record by 196° (or 162°).

A child can select a different pair of visual markings and pair of record tracks defining a different question and answer by rotating the pointer wheel 24 on which the pointer is slideably mounted, in the clockwise or forward direction indicated by arrow F. In many cases, a child will not rotate the pointer far enough, and it will lie in between two different pairs of markings. This could lead to confusion if a record track is played which corresponds to a different question or answer marking than the marking to which the pointer appears to be directed. To prevent such confusion, the pointer wheel 24 is provided with a positive latching mechanism which includes a resilient pawl which can engage ratchets 74 formed in the housing 10 of the toy. There are ten ratchets 74 uniformly spaced about the axis of rotation of the pointer wheel. When the drawstring is being pulled and the drag stop 46 engages one of the pointer stops such as pointer stop 48, the entire pointer wheel 24 tends to rotate in reverse. In fact, the pointer wheel can rotate in reverse until the pawl 72 fixed thereto hits a ratchet 74. When the pawl 72 hits the ratchet, the pointer 20 will be centered on a question-answer pair. The pawl 72 prevents further counterclockwise (reverse) rotation of the pointer wheel and prevents any further counterclockwise rotation of the turntable and record.

When a child decides to slide the pointer 20 between the question and answer positions, he should slide the pointer radially as far as it will go. To assure full radial sliding of the pointer, and therefore to assure that one of the pointer stops 48 or 50 can engage the drag stop, the mechanism is provided with an over-center spring 76. The spring 76 has one end 78 fixed to the pointer wheel 24 and an opposite end 80 fixed to the pointer 20. Once the pointer 20 has been slid slightly more than half-way towards its opposite radial position, the spring 76 pushes it the rest of the way.

Figure 3:
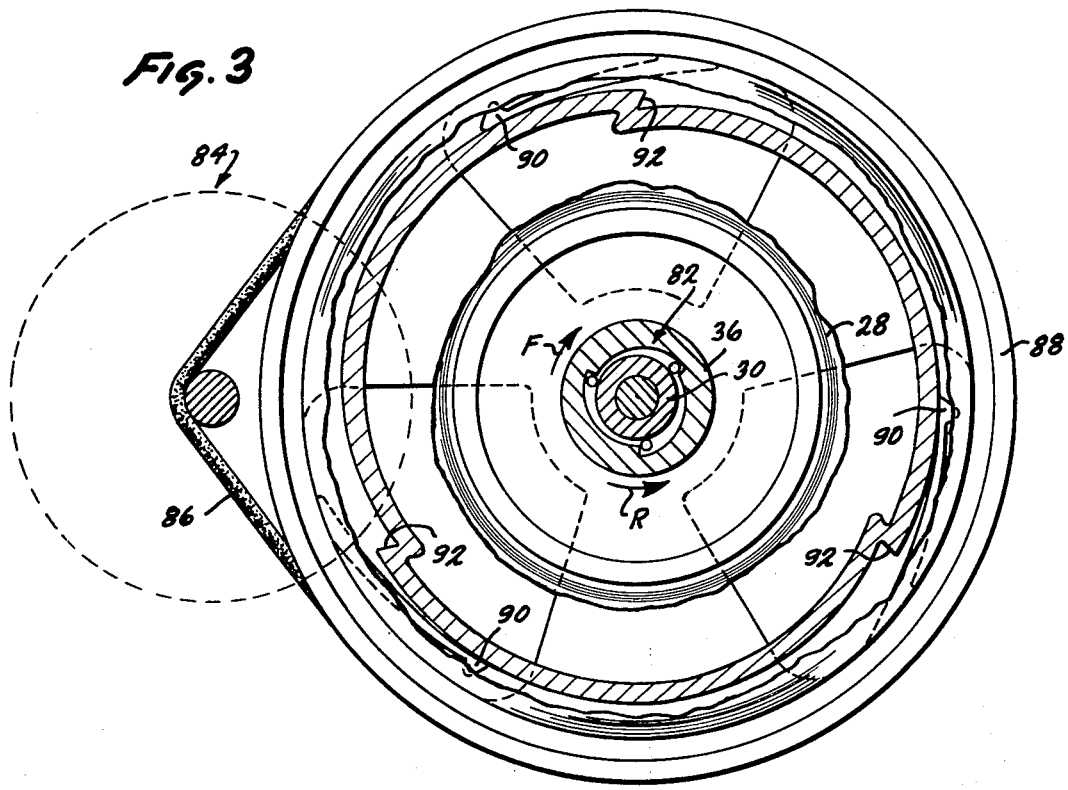
FIG. 3 is a view taken on line 3—3 of FIG. 2.

The phonograph mechanism employs several clutches to positively drive or to enable slippage of certain members when they are driven in certain directions. As mentioned above, a plate clutch member 38 (FIG. 2) couples the string-receiving sheave 36 to the turntable 30 to rotate the turntable in reverse during windup. The plate clutch member 38 allows slippage after the drag stop 46 engages a pointer stop 48, 50. During forward rotation of the turntable, the plate clutch may not be able to supply sufficient torque to positively rotate the turntable. Accordingly, a roller clutch 82, shown in FIGS. 2 and 3, is provided which positively engages during forward rotation in the direction of arrow F. Thus, as the spring drives the sheave 36 in the forward direction, there is positive driving of the turntable to assure record rotation.

In order to maintain a constant speed of rotation of the turntable 30 in the forward direction, when a record groove is being played, a governor 84, shown in FIGS. 2 and 3, is provided which is coupled to the turntable. The coupling is through a belt 86 which extends around the governor shaft and around a clutch wheel 88 that can be driven by the turntable 30. As shown in FIG. 3, the clutch wheel 88 has three pawls 90 that can engage ratchet teeth 92 formed in the turntable 30. The pawls 90 are constructed of a resilient material and are biased against the ratchets. However, when the turntable 30 rotates in the reverse direction as indicated by arrow R, the pawls 90 slip on the ratchets 92 and the turntable does not drive the clutch wheel 88 and the governor is not positively rotated. When the turntable rotates in the forward direction as indicated by arrow F, the pawls 90 can positively engage the ratchets 92 and the turntable can positively drive the clutch wheel 88 and the governor 84. The turntable 30 may be provided with many ratchet teeth, such as thirteen, so that there is a minimal angular rotation of the turntable before a ratchet tooth engages a pawl 90 and the speed of turntable rotation is well regulated.

Thus, the invention provides a phonograph toy which allows a child to select visual markings and record tracks defining a question and answer pair by merely rotating a pointer wheel, and to alternately select the question and answer by sliding a pointer on the pointer wheel. When the child plays the phonograph, by pulling and releasing the pull ring on the drawstring, a record track is played which matches the marking indicated by the pointer. The phonograph mechanism employs an indexing member with a helical ramp that engages a drag member with a stop. The ramp moves the drag stop into and out of position to engage a pointer stop, as the turntable rotates in reverse and in a forward direction, respectively. The mechanism is relatively simple, so that it can be mass produced at low cost. While the phonograph toy has been shown in an embodiment that allows the selection of pairs of subjects representing a question and an answer to the question, other pairs of matching subjects can be utilized instead, wherein the record track does not directly ask a question or provide an answer.

Although particular embodiments of the invention have been described and illustrated herein, it is recognized that modifications and variations may readily occur to those skilled in the art and, consequently, it is intended that the claims be interpreted to cover such modifications and equivalents.

What is being claimed is:

1. A phonograph toy comprising:
   a housing;
   a visual display mounted on said housing and containing spaced pairs of markings;
   pointer means for indicating particular markings, said pointer means movable relative to said display in a first manner to select a pair of said markings and in a second manner to alternately indicate each marking of the selected pair;
   a record within said housing having pairs of record tracks corresponding to said pairs of markings, each pair of said tracks including a first track matching a first marking of the corresponding pair of markings and a second track matching a second marking of the corresponding pair of markings; and
   means responsive to the position of said pointer means relative to said display, for playing the record track which matches the marking indicated by said pointer means, whereby a child can easily select a marking pair and alternately play recordings corresponding to each marking of the pair with simple manipulations.

2. The phonograph toy described in claim 1 wherein:
   said first marking of each pair visually indicates the subject matter of a question and said second marking of the pair visually indicates the subject matter of the answer to the question; and said first and said second tracks of each pair contain recordings that respectively ask the question and answer it.

3. The phonograph toy described in claim 1 wherein:

said record has a face with interleaved spiral grooves, said grooves having circumferentially spaced leadin portions; and said means responsive to the relative position of said pointer means includes a pivotally mounted tone arm having a stylus for playing said grooves, a rotatably mounted turntable supporting said record to rotate it, means for raising said tone arm stylus off said record and lowering it back thereon to fall into a leadin groove portion that lies under the stylus, a drag stop coupled to said turntable, first and second pointer stops mounted on said pointer means, said pointer means mounted to rotate about said record and slide substantially radially relative to it, said pointer stops positioned on said pointer means to alternately move into position to engage said drag stop as said pointer means slides; and means for successively rotating said turntable in a predetermined reverse direction until said drag stop fully engages one of said pointer stops, lowering said stylus onto said record, and rotating said turntable in a predetermined forward direction.

4. A phonograph toy comprising:

a housing having a ring-shaped area containing pairs of circumferentially spaced markings, the markings of each pair substantially radially spaced from each other;

a pointer assembly including a pointer wheel rotatably mounted on said housing and a pointer member slideably mounted on said pointer wheel to slide between first and second positions thereon, so that said pointer member moves adjacent to different pairs of markings as said wheel rotates and alternatively indicates different markings of the pair to which it is adjacent as it is slid between said first and second positions on said wheel;

a record having a plurality of record tracks thereon, each track matching a different one of said markings;

tone arm means movable between positions to engage and disengage said record tracks;

stop means coupled to said pointer member to be moved both when said pointer member rotates with said pointer wheel and when it slides on said pointer wheel;

means responsive to the position of said stop means for directing said tone arm means into engagement with the track which matches the marking indicated by said pointer member; and means for moving said record relative to said tone arm means to play the track engaged by the tone arm means.

5. The phonograph toy described in claim 4 including:

a drag stop; and means for coupling said drag stop to said record to move with it and engage said stop means; and wherein said record has a substantially flat face and is mounted to rotate about a predetermined axis, and said record tracks form interleaved spiral grooves in said face with leadin portions circumferentially spaced about said axis;

said means for moving said record includes means for urging said record to rotate in a first direction so that it rotates until said drag stop engages said stop means, and for rotating said record in a second direction opposite to said first direction; and said means for directing said tone arm means includes means moving said tone arm means against said record substantially between rotation of said record in said first and second directions.

6. The phonograph toy described in claim 5 wherein:

said stop means includes a pair of stops positioned on said pointer member for alternate movement into the path of said drag stop.

7. The phonograph toy described in claim 5 wherein:

said means for coupling said drag stop to said record includes an index member fixed to said record to rotate with it, said index member having a helical ramp portion; and a drag member mounted to rotate on said housing and wobble, at least in part, about its axis of rotation, said drag member engaged with said ramp portion of said index member to wobble in response to rotation relative to said index member, said drag stop being mounted on said drag member to move into and out of the path of said stop means as said drag member wobbles.

8. A phonograph toy comprising:

a housing;

a turntable assembly rotatably mounted on said housing, said turntable assembly including a record that has a plurality of interleaved spiral grooves with leadin portions circumferentially spaced thereon, and said turntable assembly also including an index member with a helical ramp portion;

a drag member mounted to rotate on said housing while resisting such rotation, and to permit wobbling of at least a portion of the drag member about its axis of rotation, said drag member having a stop and said drag member engaged with said ramp portion of said index member to wobble at least said portion thereof as said index member rotates relative to it;

said index member having a pair of driving surfaces for rotating said drag member in either of two opposite directions of rotation, said driving surfaces circumferentially spaced so that said drag member can move up said ramp portion prior to engagement with the first driving surface and can move down the ramp portion prior to engagement with the other driving surface;

a manually movable selector member mounted on said housing and having stop means positionable at different locations along the path of said stop on said drag member when said drag member is at the top of said ramp;

means for alternately urging said turntable to rotate in said two opposite directions; and tone arm means for entering the leadin portion of a record groove which lies at a position determined by said stop means on said selector member.

9. The phonograph toy described in claim 8 wherein:
said selector member is mounted to rotate about the same axis as said turntable and to slide substantially in a radial direction, and said stop means includes a pair of stop members mounted on said selector member to alternately move into the path of said stop on said drag member.

10. The phonograph toy described in claim 8 wherein:
said selector member is mounted to rotate on said housing; and including indexing means coupled to said selector member and defining a plurality of circumferentially spaced positions for allowing rotation of said selector member in a first direction and preventing rotation past the nearest of said circumferentially spaced positions in said second direction.

11. A phonograph toy comprising:

a visual display containing spaced sets of markings;

pointer means for indicating particular markings, said pointer means being movable relative to said display in a first manner to select a particular set of said markings and in a second manner to alternately indicate each marking of the selected set;

a recorded message carrier means having sets of recorded messages corresponding to said sets of markings, each set of said messages including a first message matching a first marking of the corresponding set of markings and a second message matching a second marking of the corresponding set of markings; and means responsive to the position of said pointer means relative to said display, for playing the message which matches the marking indicated by said pointer means, whereby a child can easily select a marking set and alternately play recordings corresponding to each marking of the set with simple manipulations.

* * * * *